United States Patent [19]

de Filippis et al.

[11] 4,235,282
[45] Nov. 25, 1980

[54] HEATING AND REFRIGERATING TRAY CABINET FOR DISTRIBUTING HOT AND COLD DISHES

[76] Inventors: Modeste de Filippis, 11 Ave. Felix Faure, Lyons 7eme, Rhone; Jean Rollet, "Les Vignes", Dardilly, Rhone, both of France

[21] Appl. No.: 866,285

[22] Filed: Jan. 3, 1978

[30] Foreign Application Priority Data

Dec. 31, 1976 [FR] France .................... 76 39877
Dec. 1, 1977 [FR] France .................... 77 36933

[51] Int. Cl.³ ........................................ F25B 29/00
[52] U.S. Cl. ........................... 165/61; 126/246; 219/386; 219/400; 312/236; 165/64
[58] Field of Search .............. 165/48, 58, 61, 64; 126/246, 268; 312/236; 219/386, 387, 400, 433, 456, 438, 460

[56] References Cited

U.S. PATENT DOCUMENTS

| | | | |
|---|---|---|---|
| 3,043,943 | 7/1962 | Moot | 219/460 |
| 3,291,546 | 12/1966 | Traycoff | 312/246 |
| 3,608,627 | 9/1971 | Shevlin | 219/400 X |
| 3,908,749 | 9/1975 | Williams | 165/61 X |
| 3,965,969 | 6/1976 | Williamson | 312/236 X |
| 4,019,022 | 4/1977 | Seider et al. | 219/386 |
| 4,103,736 | 8/1978 | Colato et al. | 165/48 |

FOREIGN PATENT DOCUMENTS

| | | | |
|---|---|---|---|
| 665316 | 6/1963 | Canada | 126/246 |
| 2040255 | 2/1972 | Fed. Rep. of Germany | 219/460 |
| 2318256 | 10/1973 | Fed. Rep. of Germany | 219/386 |
| 2207677 | 11/1972 | France | 312/236 |

*Primary Examiner*—Albert W. Davis
*Assistant Examiner*—Margaret A. Focarino
*Attorney, Agent, or Firm*—Irving M. Weiner; John L. Shortley; Melvin Yedlin

[57] ABSTRACT

A tray cabinet wherein each comprises a heating chamber formed between a shell and a detachable cover. A heating element is placed between the base of the shell and a shield. The shell has an edge embedded in the thickness of an upper plate of the tray. A dense foam fills the interior space of the tray enclosed between the upper plate and a lower plate. The tray and the cover are single rigid and heavy components, not susceptible to deformation due to thermal expansion.

27 Claims, 18 Drawing Figures

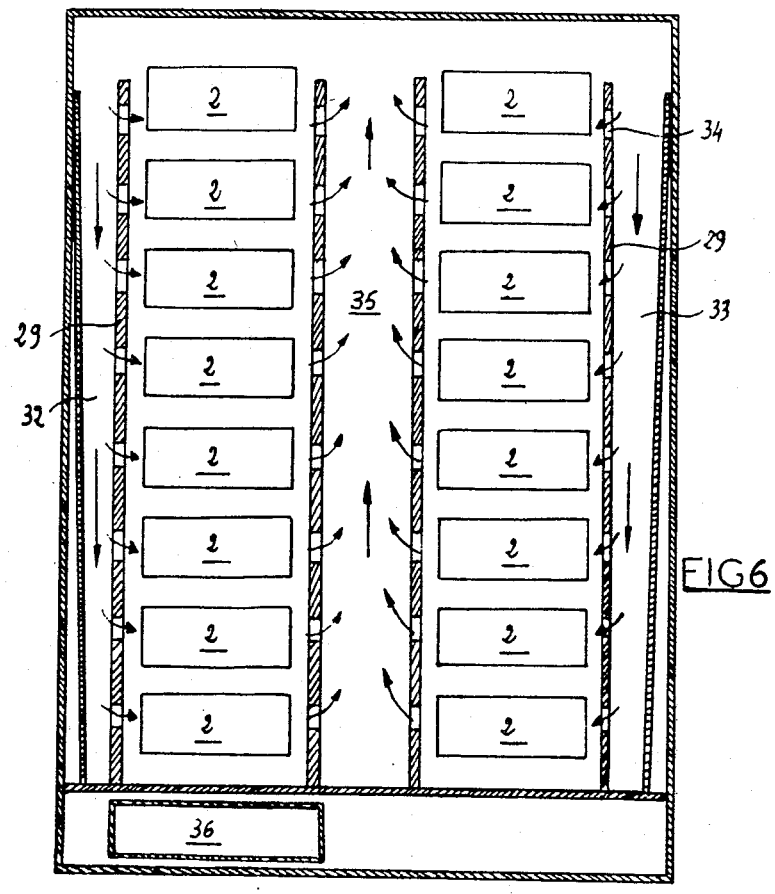
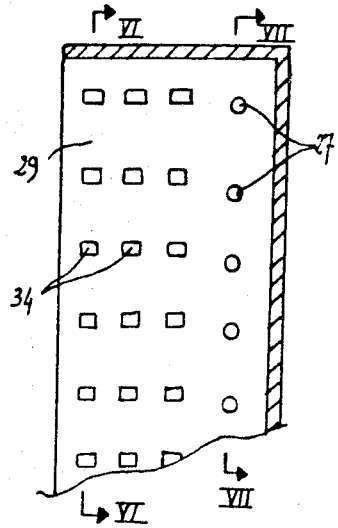
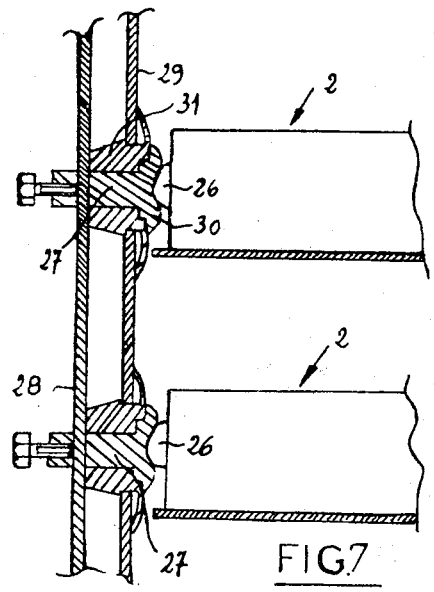
FIG.6
FIG.5
FIG.7

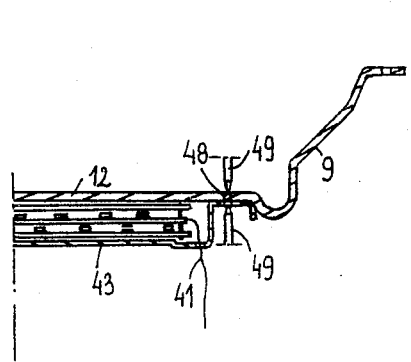
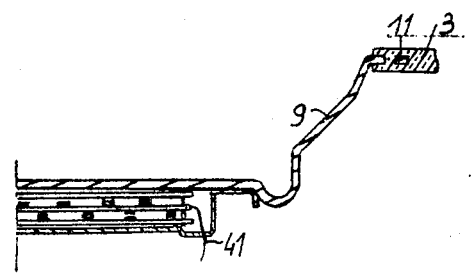
FIG.12    FIG.13
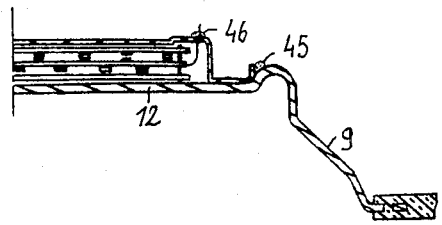
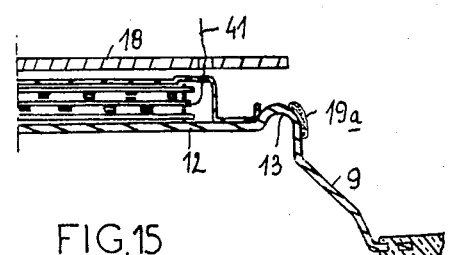
FIG.14    FIG.15
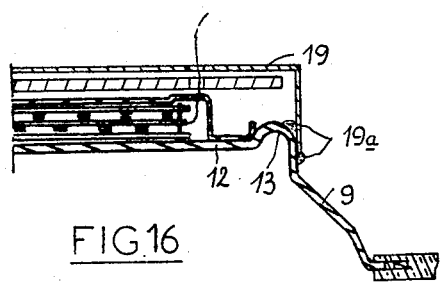
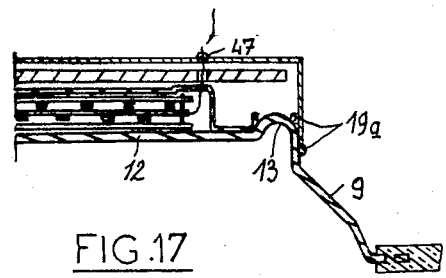
FIG.16    FIG.17
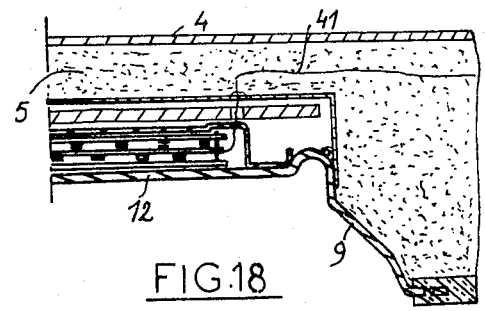
FIG.18

HEATING AND REFRIGERATING TRAY CABINET FOR DISTRIBUTING HOT AND COLD DISHES

BACKGROUND OF THE INVENTION

The present invention relates to a tray cabinet for distributing meals with hot and cold dishes on the same tray.

More particularly, the invention provides a tray cabinet in which the dishes may be kept perfectly from their reception to their distribution and in which hot dishes may be reheated before the time of the meal.

Further, the invention provides a tray cabinet by means of which it is possible to distribute a number of meals in a very short time, for example approximately thirty meals in less than two minutes.

SUMMARY OF THE INVENTION

A tray cabinet according to the invention is characterized in that it comprises on the one hand a refrigerating device to pump refrigerated air into a set of shelves for receiving removable trays and on the other hand means of individually heating restricted sections in the trays.

According to an additional characteristic of the invention, each tray comprises an upper plate of molded plastic material forming cavities in which it is possible to place food or other articles, and on the other hand a lower plate, an enclosed space between these two plates being entirely filled with a dense foam expanded in place.

According to an additional characteristic of the invention, the two plates are welded together all around the base of the tray and the lower plate includes at least one hole through which it is possible to inject a foam generating mixture, this mixture mainly comprising a phenolic resin.

According to an additional characteristic of the invention, each tray includes a heating area formed between a stainless metal shell of which the rim is embedded in the thickness of the upper molded plastic plate and a removable insulating cover able to fit into the metal shell.

The metal shell according to the invention comprises: perforations in its periphery which is set in the thickness of the upper plate of the tray; a channel around the edge of its base to avoid deformation due to thermal expansion while ensuring that water from condensation in the space will be caught; and internal protruberances fixed to the base to keep a receptacle away from the rest of the base within the space.

According to an additional characteristic of the invention, the lower space of the metal shell is covered by a heating element sheathed by a layer of ceramic fibers, by an aluminium reflecting foil, and finally by an aluminium shield which is pressed all around onto the metal shell, a silicone sealing joint being provided to prevent the foam generating mixture from penetrating between the metal shell and the shield.

The detachable insulating cover according to the invention comprises a body made from a stainless metal sheet, covered on the outside by a layer of ceramic fibers, and then clad on the outside by a hard plastic foam in which the edges of the body are embedded.

According to an additional characteristic of the invention, the tray and its insulating cover are designed so as not to enclose any great volume of air, and so that the rigidity of the foam prevents deformation of the sheets and of the metal shell because of the movement of thermal expansion.

The heating element of the tray is supplied with electricity by means of two contact studs disposed on the opposite side edges of the tray, these studs making contact with moving studs attached to the cabinet when the tray is in the shelving, the moving studs including elastic return means permanently tending to push them against the edges of the tray, the latter being gripped between the two moving studs.

According to an additional characteristic of the invention, the cabinet includes at least one large-section sheath, which extends vertically the length of the shelving and which comprises at the height of each tray at least one small-section aperture, refrigerated air being pumped into this sheath so as to emerge through the aperture and cool the trays, finally to be recycled in the cabinet.

The cabinet according to the invention includes two lateral vertical sheaths, disposed on either side of two columns of trays, and in which refrigerated air is pumped from top to bottom, while the air is pumped from bottom to top in a vertical sheath which extends between the two columns of trays and which includes apertures to catch the air blown onto the trays.

According to an additional characteristic of the invention, the major part of the electrical equipment of the cabinet is placed in the base of the cabinet inside a removable drawer, and sheltered from the humidity which mainly arises from condensation.

In one embodiment of the invention, the heating element of the tray is constituted by a flat wire wound around at least one strip of insulating material, two sheets of the same material being placed on either side of the juxtaposed strips to form the insulating protection, and the whole being held pressed against the bottom of the metal shell by means of a pressed stainless metal plate welded around its periphery against the bottom of the metal shell and interposed between the covered element and the layer of ceramic fiber.

According to an additional characteristic of the invention, the plates and strips of insulating material are assembled by clipping with stainless metal clips.

The invention further provides that each end of the element is welded to a small stainless metal plate to which the end of the corresponding electric feed wire is also welded, the two metal plates of the element being disposed above an indentation in the metal plate attached to the bottom of the shell in such a way that the pressure brought about between the metal plate and the bottom of the shell acts level with the wire and not with the small metal junction plates.

According to an additional characteristic of the invention, the periphery of the stainless metal plate is spot-welded against the bottom of the metal shell and a silicone sealing joint is placed to be in contact on the one hand with the shell and on the other with the plate, filling the gap between them.

A process according to the invention for the manufacture of a tray is characterized in that it comprises the following successive operations:

(a) the protected element is placed against the bottom of the metal shell;

(b) the corresponding metal plate is placed against the bottom of the metal shell so that this metal plate completely covers the protected element;

(c) the said metal plate is spot-welded against the bottom of the shell;

(d) the upper plate of the tray is injected around the metal shell in such a way that the periphery of the said shell is embedded in the thickness of the upper plate of the plastic tray;

(e) a silicone seal is placed on the one hand around all the circumference of the metal plate and on the other hand around the electric element feed wires in the holes by which these wires pass through the shell;

(f) the silicone seals are allowed to polymerized in the air;

(g) the layer of textile fibers is placed against the metal plate; (h) a silicone seal is placed against the embossing of the shell on which the aluminium shield will engage;

(i) the aluminium shield is put in place;

(j) the assembly is left in the press until the silicone seal is polymerized.

(k) the element is put under voltage for a certain time by connecting the feed wires which pass through holes in the aluminium shell so that the water vapor coming from possible humidity in the layer of textile fiber may escape by the said holes in the aluminium shell; and (l) these holes are blocked by means of a silicone seal.

The attached drawings, given by way of non-limiting example, will allow the characteristics of the invention to be better understood.

BRIEF DESCRIPTION OF THE DRAWINGS

FIG. 5 is a part section taken along line V—V in FIG. 1.

FIG. 6 is a section taken along line VI—VI in FIG. 5.

FIG. 7 is a part section taken along line VII—VII in FIG. 5.

FIGS. 12 to 18 are part views corresponding to FIG. 9, to illustrate the successive phases of the manufacturing process of a tray according to the invention.

DETAILED DESCRIPTION OF PREFERRED EMBODIMENT

Figure 1:
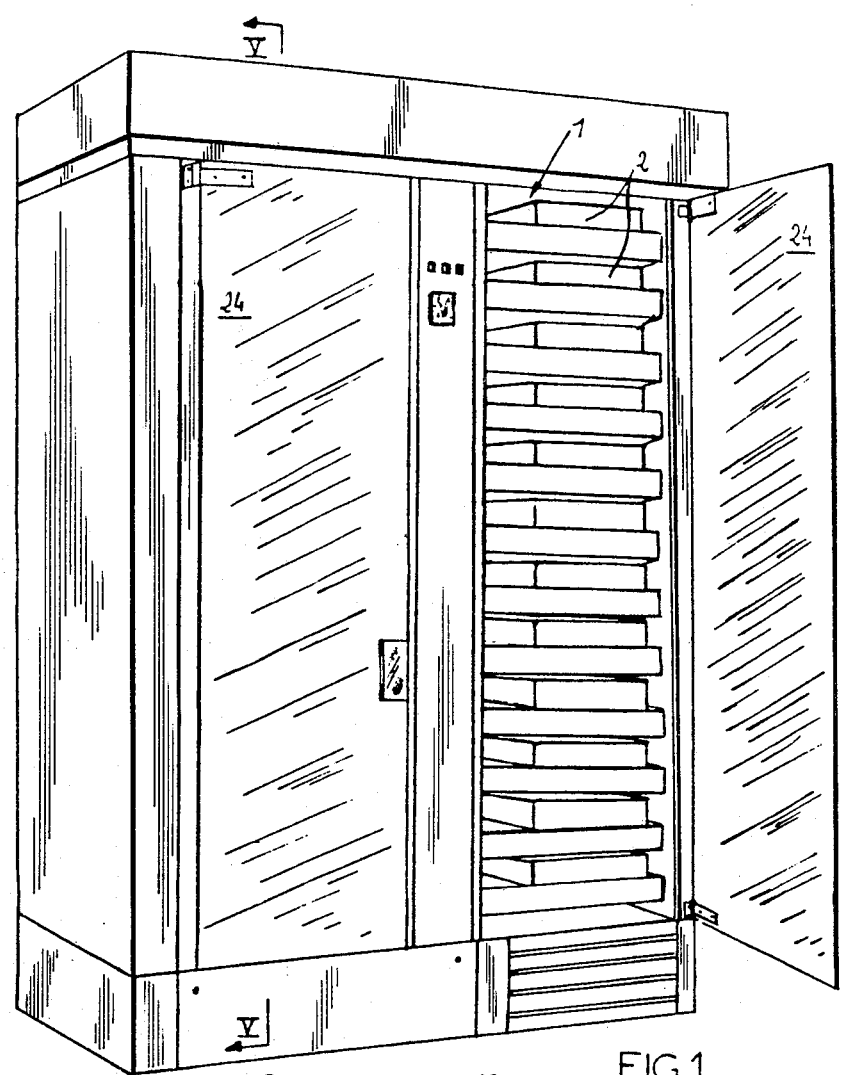
FIG. 1 is a perspective view of a tray cabinet according to the invention.
Figure 2:
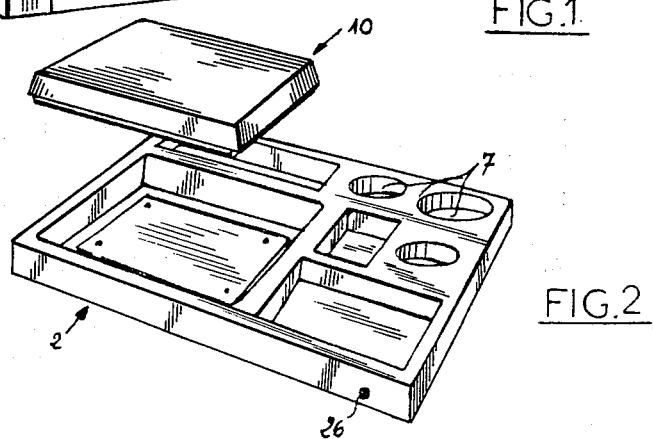
FIG. 2 is a perspective view of one of the trays.
Figure 3:
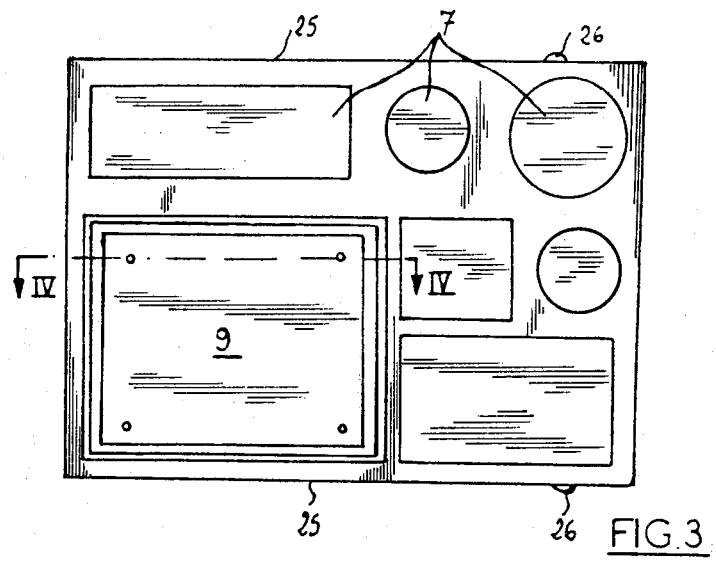
FIG. 3 is a plan view of this tray.
Figure 4:
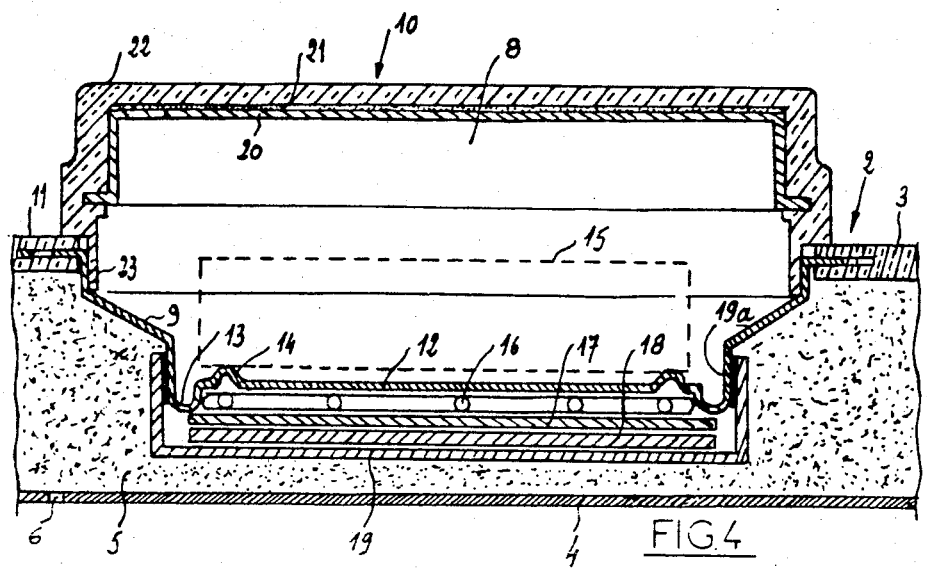
FIG. 4 is a section taken along line IV—IV in FIG. 3.
Figure 8:
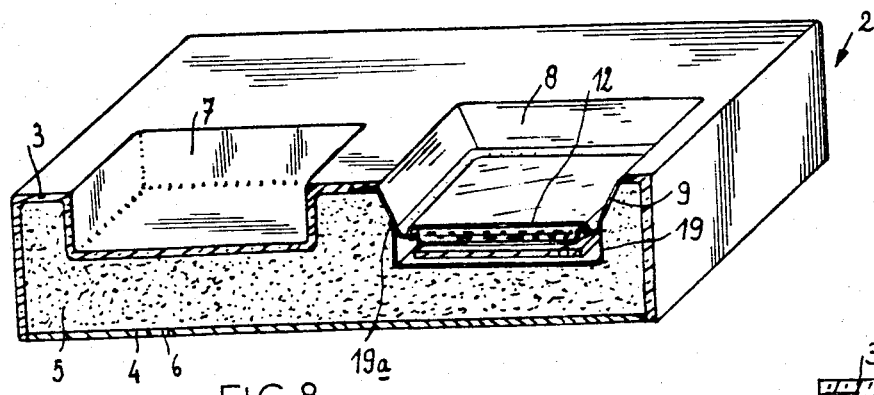
FIG. 8 is a transverse sectional view of a tray according to the invention.

There is shown in FIG. 1 a heating and refrigerating tray cabinet according to the invention. This cabinet comprises shelving 1 in which the trays 2 are arranged in two vertical columns. One of these trays 2 is shown in FIGS. 2 to 4. The tray 2 comprises first of all an upper plate 3 and a lower plate 4 welded together all around the base of the tray and enclosing between them an interior space entirely filled with a dense foam 5. This foam is obtained by expanding in place a foam generating mixture with a phenolic resin base. The mixture is injected into the interior space of the tray through holes 6 in the lower plate 4.

The upper plate 3 forms a series of cavities 7 in which it is possible to place food, place settings, or any other article necessary for a meal.

A heating area 8 is formed between a stainless metal shell 9 fixed to the upper plate 3 and a detachable insulating cover 10. The shell 9 carries a flat peripheral edge 11, perforated with holes, which is embedded in the thickness of the upper plate 3, the latter being injection-molded around the shell 9. The shell 9 is obtained by pressing a metal sheet, and its base 12 includes on the one hand a peripheral channel 13 and on the other hand four protruberances 14 adjacent the corners. The channel 13 avoids deformation due to thermal expansion and likewise ensures that water which condenses inside the space 8 will be caught. The protruberances 14 project above the rest of the base 12. They allow the bottom of a receptacle 15 to be kept away from the base 12, so that foodstuffs do not stick to the receptacle 15.

A heating element 16 is placed against the lower face of the base 12 and provides a flexible resistance provided with a silicone insulating sheathing by extrusion under vacuum. A layer 17 of ceramic fibers extends below the heating element 16, this layer 17 not including any binder in order to avoid any degasification. A reflecting foil of aluminium 18 finally extends below the layer 17, while the heating element 16, the layer 17 and the foil 18 are covered by an aluminium shield 19 pressed all around the metal shell 9. A silicone sealing joint 19a is placed between the shield 19 and the shell 9 to prevent the foam generating mixture from penetrating between these two components.

The insulating cover 10 comprises a body 20 obtained by pressing a stainless metal plate. The body 20 is covered on the outside by a layer of ceramic fiber 21 while a cladding of rigid plastic foam 22 covers both the layer 21 and the body 20. The edges of the body 20 are embedded in the cladding 22, which is injection-molded around the body 20. The cladding 22 carries a lip 23 around the lower edge of the cover 10, and this edge fits into the upper opening of the shell 9. The water which may condense on the internal surface of the cover 10 therefore falls back into the space 8 in the shell 9 and not onto the upper surface of the tray.

It will be noted that the respective compositions of the dense phenolic foam 5 and of the cladding 22 are with advantage chosen to adhere perfectly on the one hand to the plates 3 and 4 and on the other to the body 20. The tray 2 and the cover 10 are therefore two heavy single pieces which always remain protected from deformation by thermal expansion. This expansion would normally arise on the one hand during the storage of the tray inside the refrigerating and heating cabinet and on the other hand during washing of the tray inside a dishwashing machine.

The cabinet comprises two front doors 24 each extending in front of one of the two vertical columns of trays 2. The trays 2 are put in and taken out of the shelving 1 by sliding them in parallel on their two opposite lateral edges 25. Each element 16 is fed with electricity by means of two studs 26 each situated on an edge 25. Each stud 26 makes contact with a moving stud 27 (FIG. 7) fixed in the cabinet. As may be seen in FIG. 7, each moving stud 27 is connected to an electrical conductor 28 situated on the other side of an internal partition 29 in the cabinet in relation to the corresponding tray 2. The central portion of the moving stud 27 between the electrical conductor 28 and the head 30 of the stud 27 passes through an insulating sleeve of flexible plastic material 31 which extends through the partition 29. The sleeve 31 is designed so as to permanently tend to press the moving stud 27 towards the corresponding tray 2. The contact between the respective studs 26 and 27 is established by simple sliding, each tray being thus gripped between two opposite studs 27. The placing of the moving studs 27 inside the cabinet is advantageous in that the studs of opposite polarity are necessarily attached to two different positions. For a person to be electrocuted while cleaning the apparatus, it would be necessary for him to touch simultaneously two studs on two opposite walls, which is impossible while working with only one hand.

Two lateral vertical sheaths 32 and 33 extend on either side of two stacks of trays inside the cabinet (FIG. 6). Each of these sheaths carries three rectangular apertures at each place provided for a tray 2 (FIG. 7). The apertures 34 have a section much smaller than that of the sheaths, the transverse section of each sheath diminishing from top to bottom. Another vertical sheath 35 extends between the two stacks of trays. This sheath also carries three rectangular apertures 34 opposite each tray.

The cabinet is fitted with a refrigerating device which ensures a circulation of refrigerated air in a closed circuit within the apparatus. The refrigerated air which is pumped from the top of the lateral sheaths 32 and 33 is sucked upwards in the central sheath 35. Owing to this system of sheaths, the flow of cold air reaches each tray well. In fact, without the presence of the apertures 34, the cool air pumped downwards on each side of the columns of trays would risk being drawn in again into the central part of the apparatus before reaching the trays at the bottom if the upper part of the cabinet had already had its trays removed. Any short circuit of this type is therefore avoided even if some trays are missing The major part of the electrical apparatus is collected in a removable and interchangeable drawer 36 placed in the base of the cabinet. This drawer is protected from humidity while benefiting from the heat of the refrigerating unit.

Finally, the cabinet is fitted with a device for regulating the heating of the spaces 8. It is a device for programmed control using time constants, and not temperature constants. In fact, there exists no temperature sensor or thermostat inside the spaces 8 of the trays, but the heating elements 16 are fed with electricity intermittently at predetermined times. This allows a regular rise in temperature to be obtained compatible with the gastronomic quality of the dishes. Thus it is possible to substantially avoid local overheating, and different types of receptacles for the dishes may be used. The regulation also allows hot dishes to be kept at the correct temperature for the entire duration of the service, and the refrigerating unit includes an automatic defrosting system which can never be switched on during heating periods, in order to avoid a rise in the temperature of the air which is circulating in a closed circuit in the apparatus.

The trays will preferably be used by filling the cavities 7 situated along the same longitudinal edge as the space 8 with cold dishes such as hors d'ouvres. The user can thus eat his meal without having to turn the tray. The other cavities are used to hold, for example, the place settings, the glasses, the drinks, and other things.

In normal use the cabinet allows dishes to be kept at the correct temperature for more than two hours, owing to the programmed regulation.

Cold dishes may also be served in the heating spaces of the trays. It is only necessary to slide the trays into the cabinet the other way round, so that the studs 26 are in front and do not come into contact with the moving studs 27. In this way the heating elements of the trays in question are not supplied, while the heating elements of the trays which are slid in normally are still supplied.

Figure 9:
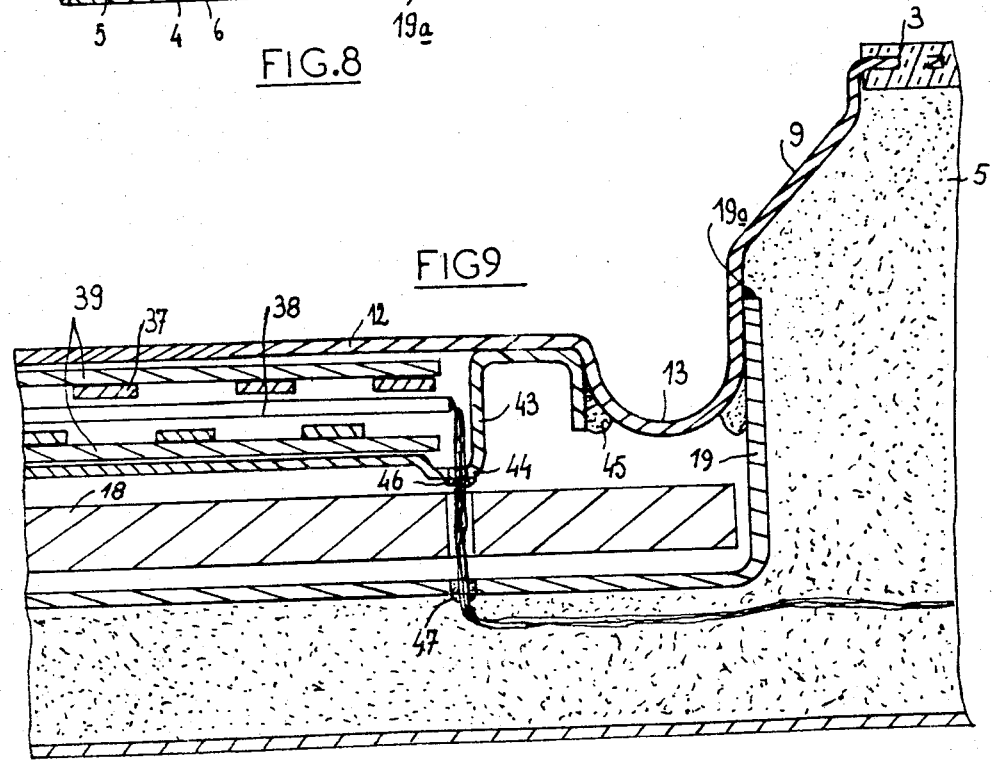
FIG. 9 is a part view in a larger scale of FIG. 1.
Figure 10:
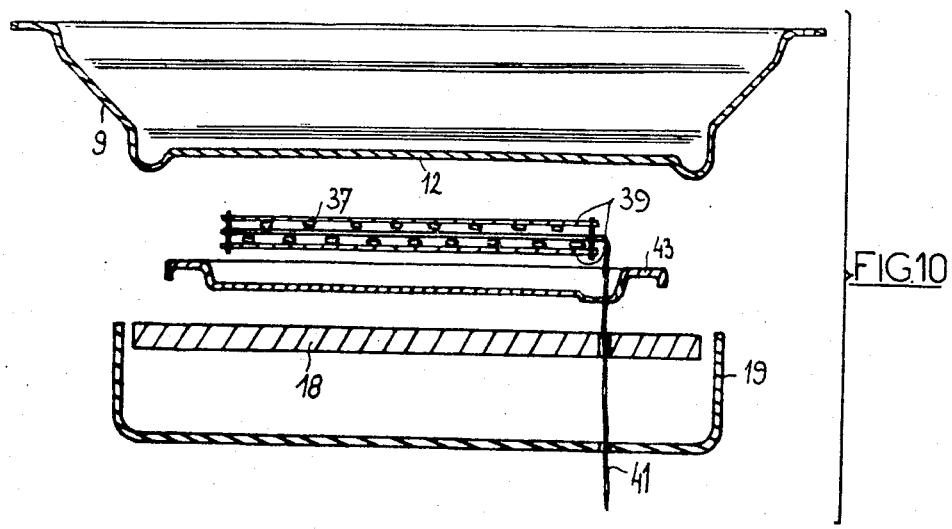
FIG. 10 is an exploded view of the lower part of the heaing area of a tray.

According to a second embodiment of the invention illustrated in FIGS. 9 and 10, the element is constituted in each tray by a flat stainless wire 37 wound around two strips of material 38, two plates 39 of the same material being placed on either side of the juxtaposed strips 38 in order to form an insulating protection. The strips 38 and the plates 39 are made from a material with special insulating fibers which resist heat. The wire 37 is made for example from an alloy of nickel and chrome. Each of its ends is welded to a small metal connection plate 40 on which there is also welded the end of the corresponding electric feed wire 41. Some metal clips 42 hold the plates 39 and the strips 38 together. The clips 42 and the small connection plates 40 are preferably made from a stainless alloy of the same type as that from which the flat wire 37 is made. The whole is held tight against the base 12 of the shell 9 by means of a pressed stainless metal plate 43 welded around its edges to the base 12. The plate 43 carries an indentation 44 situated below the connection plates 40. The whole is designed so that the thickness of the seating for the protected element between the base 12 of the shell 9 and the plate 43 is less by about one-half millimeter than the original thickness of the stack comprising the plates 39 and the strips 38. In this way the protected element is held pressed against the base 12. The interstice formed between the plate 43 and the shell 9 is filled on the outside by a silicone joint 45. The ceramic fiber layer 18 which is in contact with the base of the shield 19 separates the latter from the plate 43 and the feed wires 41 pass through both the plate 43 and the shield 19 which carry holes for this purpose. These holes are blocked by means of silicone joints 46 and 47 respectively.

Figure 11:
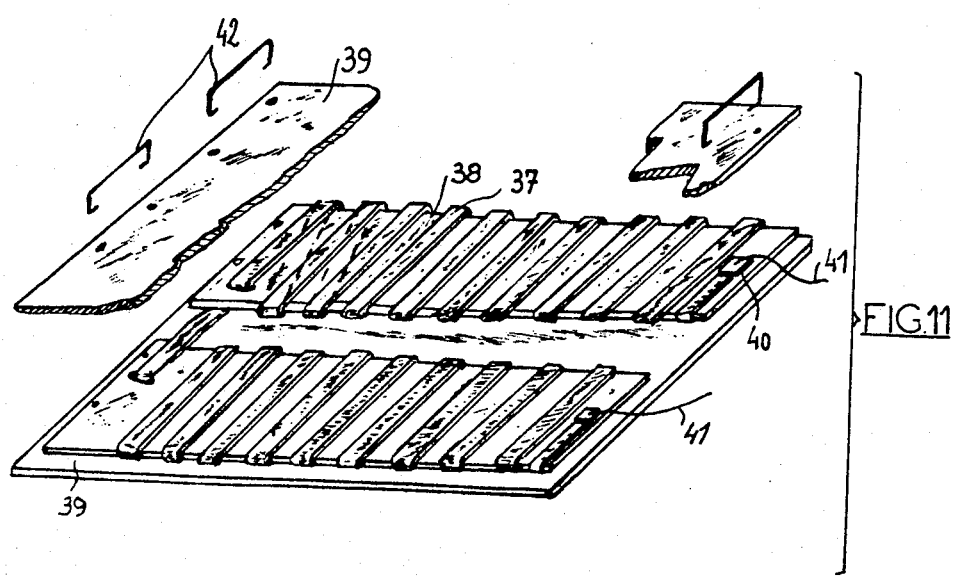
FIG. 11 is an exploded view of the protected element alone.

To proceed with the assembly of the tray, the following successive operations are carried out in order:

(a) The protected element comprising the components 37 to 42 is placed against the base 12 of the shell 9 (see FIG. 11).

(b) The plate 43 is placed against the base 12 in such a way that plate 43 completely covers the protected element, taking care to pass the feed wires 41 through the holes in the plate 43.

(c) The plate 43 is spot-welded against the base 12. FIG. 12 shows the carrying out of a spot-weld 48 by means of electrodes 49.

(d) The upper plate 3 of the tray is injected around the shell 9 in such a way that the perforated edge 11 of shell 9 is embedded in the thickness of the plastic (FIG. 13).

(e) After having turned the assembly over for convenience, the fitting of the joints 45 and 46 is carried out (FIG. 14).

(f) The two silicone joints fitted are allowed to polymerize in the air. Polymerization can take from 24 to 48 hours.

(g) The layer 18 of ceramic fiber is fitted (FIG. 15).

(h) The joint 19a is fitted. For this, the embossing constituted by the reverse of the channel 13 around the edge of the base 12 is covered wih jointing paste, particularly the exterior side of this said embossing.

(i) The shield 19 is pressed around the embossing constituted by the reverse of the channel 13, and the joint 19a is crushed, taking up its final shape.

(j) The assembly is left in the press until the joint 19a is polymerized, for example for 48 hours.

(k) The element is put under voltage for 5 to 6 minutes by feeding it with electricity by the wires 41 which pass through the holes provided in the shield 19. The element thus heats so as to reach a temperature of about 120° C. Under the effect of this temperature, the humidity in the layer 18 produces water vapor which escapes through the holes following arrow 50 (FIG. 16).

(l) The said holes are blocked by fitting the seals 47 (FIG. 17).

The tray is finished by fitting the plate 4 and by injecting the foam generating mixture which ensures the formation of the dense foam 5 (FIG. 18).

The trays manufactured in this way in particular present the following advantages:

Any penetration of phenolic foam into the space enclosing the element is avoided. The phenolic foam would bring water vapor into the said space, and this water vapor would condense and possibly cause corrosion of the element in the long term.

All the metal components situated in the space reserved for the element are stainless. Any risk of rust is avoided.

Although the tray is fitted with a real sheathed element, this element is not bulky, unlike the majority of conventional sheathed elements. This allows the bulk of the tray to be reduced.

In view of the assembly adopted and of the tight pressure of the element against the base 12 of the shell 9, the coefficient of thermal exchange is excellent, and an effective heating is obtained with a minimum consumption of electricity.

We claim:

1. A tray cabinet comprising:
a refrigerating device to pump refrigerated air into shelving capable of receiving removable trays;
at least one removable tray;
means for individually heating at least one thermally-insulated space formed in said trays;
each said tray comprising an upper plate of molded plastic material forming cavities in which food or other articles may be placed, and a lower plate of molded plastic material and welded to said upper plate all around the base of said tray;
said lower plate of said tray having at least one hole therein through which a foam generating mixture is injected so that foam expands in place, adheres strongly to the internal faces of said plates, and solidifies, completely filling the enclosed space formed between said two plates; and
each tray comprising a heating space formed between a stainless metal shell of which the periphery is embedded in the thickness of said upper plate, said upper plate being injection-molded, and a detachable insulating cover engageable in said metal shell.

2. A tray cabinet comprising:
a refrigerating device to pump refrigerated air into shelving capable of receiving removable trays;
at least one removable tray;
means for individually heating at least one thermally-insulated space formed in said trays;
each said tray comprising an upper plate of molded plastic material forming cavities in which food or other articles may be placed, and a lower plate of molded plastic material and welded to said upper plate all around the base of said tray;
said lower plate of said tray having at least one hole therein through which a foam generating mixture is injected so that foam expands in place, adheres strongly to the internal faces of said plates, and solidifies, completely filling the enclosed space formed between said two plates;
each tray comprising a heating space formed between a stainless metal shell of which the periphery is embedded in the thickness of said upper plate, said upper plate being injection-molded, and a detachable insulating cover engageable in said metal shell; and
said metal shell comprising a piece of pressed metal including:
perforations in its periphery which is embedded in the thickness of said upper plate of said tray;
a channel which runs around its base to avoid deformation owing to thermal expansion while ensuring the collection of condensation water in the insulated space; and
internal protruberances projecting above the rest of the base to serve as support for a receptacle which is thus held slightly away from the base of said shell.

3. A tray cabinet according to claim 2, characterized in that the base of the metal shell is covered externally, in order, by a heating element covered in an insulating sheath, by a layer of ceramic fiber, by a reflecting aluminum foil, and finally by an aluminium shield which is pressed all around the metal shell, a silicone sealing joint being placed between the shield and the shell to prevent the foam generating mixture from penetrating between the shell and the shield.

4. A tray cabinet according to claim 2, characterized in that the base of the metal shell of each tray is covered externally, in order, by a flat heating element covered in insulation, by a stainless metal plate fixed to the bottom of the metal shell, by a layer of ceramic fiber and finally by a shield which is fixed all around the metal shell, said element being held pressed against the base of the metal shell by said metal plate.

5. A tray cabinet comprising:
a refrigerating device to pump refrigerated air into shelving capable of receiving removable trays;
at least one removable tray;
means for individually heating at least one thermally-insulated space formed in said trays;
each said tray comprising an upper plate of molded plastic material forming cavities in which food or other articles may be placed, and a lower plate of molded plastic material and welded to said upper plate all around the base of said tray;
said lower plate of said tray having at least one hole therein through which a foam generating mixture is injected so that foam expands in place, adheres strongly to the internal faces of said plates, and solidifies, completely filling the enclosed space formed between said two plates;
each tray comprising a heating space formed between a stainless metal shell of which the periphery is embedded in the thickness of said upper plate, said upper plate being injection-molded, and a detachable insulating cover engageable in said metal shell; and
said base of said metal shell being covered externally, in order, by a heating element covered in an insulating sheath, by a layer of ceramic fiber, by a reflecting aluminum foil, and finally by an aluminum shield which is pressed all around said metal shell, a silicone sealing joint being placed between said shield and said shell to prevent said foam generating mixture from penetrating between said shell and said shield.

6. A tray cabinet comprising:
a refrigerating device to pump refrigerated air into shelving capable of receiving removable trays;
at least one removable tray;
means for individually heating at least one thermally-insulated space formed in said trays;
each said tray comprising an upper plate of molded plastic material forming cavities in which food or other articles may be placed, and a lower plate of molded plastic material and welded to said upper plate all around the base of said tray;
said lower plate of said tray having at least one hole therein through which a foam generating mixture is injected so that foam expands in place, adheres strongly to the internal faces of said plates, and solidifies, completely filling the enclosed space formed between said two plates;
each tray comprising a heating space formed between a stainless metal shell of which the periphery is embedded in the thickness of said upper plate, said upper plate being injection-molded, and a detachable insulating cover engageable in said metal shell; and
said cover comprising a pressed stainless metal body covered on the outside by a layer of ceramic fiber, the whole being encased in a cladding of rigid plastic foam injection-molded around said body, said cladding carrying around the edge of said cover a lip engageable in the upper opening of said metal shell, while the plastic foam is selected so as to adhere strongly to said metal body.

7. A tray cabinet comprising:
a refrigerating device to pump refrigerated air into shelving capable of receiving removable trays;
at least one removable tray;
means for individually heating at least one thermally-insulated space formed in said trays;
each said tray comprising an upper plate of molded plastic material forming cavities in which food or other articles may be placed, and a lower plate of molded plastic material and welded to said upper plate all around the base of said tray;
said lower plate of said tray having at least one hole therein through which a foam generating mixture is injected so that foam expands in place, adheres strongly to the internal faces of said plates, and solidifies, completely filling the enclosed space formed between said two plates; and
each tray being fitted with an internal heating element supplied with electricity by means of two contact studs disposed on the opposite lateral edges of said tray, said studs making contact with moving studs fixed to said cabinet when said tray is in said shelving, said moving studs being connected with flexible means of return which tend permanently to press them against the corresponding edges of said tray, said tray being consequently gripped between two moving studs.

8. A tray cabinet according to claim 7, wherein:
said cabinet comprises a device for regulating the heating of the thermally insulated heating chambers in said trays, the regulation being carried out by time constants, by supplying said electric elements of said trays with electricity intermittently according to intervals of time predetermined in accordance with a heating program.

9. A tray cabinet comprising:
a refrigerating device to pump refrigerated air into shelving capable of receiving removable trays;
at least one removable tray;
means for individually heating at least one thermally-insulated space formed in said trays; and
said cabinet comprising at least one large-section sheath which extends vertically along said shelving and which itself carries at least one small-section aperture at the height of each tray, refrigerated air being pumped into said sheath to emerge through said apertures and cool said trays, to be finally recycled inside said cabinet.

10. A tray cabinet according to claim 9, wherein:
said cabinet comprises two lateral vertical sheaths disposed on either side of two columns of trays and in which refrigerated air is pumped from the top the air blown onto said trays being collected by means of apertures in a central vertical sheath which extends between said two columns of trays and in which the air is drawn upwardly.

11. A tray cabinet comprising:
a refrigerating device to pump refrigerated air into shelving capable of receiving removable trays;
at least one removable tray; 'means for individually heating at least one thermally-insulated space formed in said trays;
the electrical apparatus of said cabinet being placed substantially inside a removable drawer located in the base of said cabinet, and protected from humidity coming mainly from condensation.

12. A tray cabinet comprising:
a refrigerating device to pump refrigerated air into shelving capable of receiving removable trays;
at least one removable tray;
means for individually heating at least one thermally-insulated space formed in said trays;
each said tray comprising an upper plate of molded plastic material forming cavities in which food or other articles may be placed, and a lower plate of molded plastic material and welded to said upper plate all around the base of said tray;
said lower plate of said tray having at least one hole therein through which a foam generating mixture is injected so that foam expands in place, adheres strongly to the internal faces of said plates, and solidifies, completely filling the enclosed space formed between said two plates;
each tray comprising a heating space formed between a stainless metal shell of which the periphery is embedded in the thickness of said upper plate, said upper plate being injection-molded, and a detachable insulating cover engageable in said metal shell; and
said base of said metal shell of each tray being covered externally, in order, by a flat heating element covered in insulation, by a stainless metal plate fixed to the bottom of said metal shell, by a layer of ceramic fiber, and finally by a shield which is fixed all around said metal shell, said element being held pressed against the base of said metal shell by said metal plate.

13. A tray cabinet according to claim 12, wherein:
said element comprises a flat stainless wire wound around at least one strip of insulating material, two plates of the same material being placed on either side of the juxtaposed strips to form an insulating protection.

14. A tray cabinet according to claim 13, wherein: said plates and said strips of insulating material resistant to heat are assembled by clipping with stainless metal clips.

15. A tray cabinet according to claim 14, wherein: the periphery of said metal plate is held against the base of said metal shell by spot-welding.

16. A tray cabinet according to claim 15, wherein: the thickness of the space reserved for said protected element between the base of said shell and said metal plate is less by approximately ½ millimeter than the original thickness comprising said strips and said plates of insulating material so as to clamp said element in place.

17. A tray cabinet according to claim 15, wherein: each end of said element is welded to a small metal connecting plate to which is also welded the end of the corresponding electric feed wire, said two small connecting plates being disposed above an indentation of said metal plate attached to the base of said shell, so that the clamping brought about between said metal plate and the base of said shell operates in line with said flat wire itself and not in line with said connecting plates.

18. A tray cabinet according to claim 3, characterized in that the cover comprises a pressed stainless metal body covered on the outside by a layer of ceramic fiber, the whole being encased in a cladding of rigid plastic foam injection-molded around the body, this cladding carrying around the edge of the cover a lip engageable in the upper opening of the metal shell, while the plastic foam is chosen so as to adhere strongly to the metal body.

19. A tray cabinet according to claim 18, characterized in that each tray is fitted with an internal heating element supplied with electricity by means of two contact studs situated on the opposite lateral edges of the tray, these studs making contact with moving studs fixed to the cabinet when the tray is in the shelving, these moving studs being connected with flexible means of return which tend permanently to press them against the corresponding edges of the tray, the latter being consequently gripped between two moving studs.

20. A tray cabinet according to claim 19, characterized in that it comprises at least one large-section sheath which extends vertically along the shelving and which itself carries at least one small-section aperture at the height of each tray, refrigerated air being pumped into this sheath to emerge through the apertures and cool the trays, to be finally recycled inside the cabinet.

21. A tray cabinet according to claim 20, characterized in that it comprises two lateral vertical sheaths situated on either side of two columns of trays and in which refrigerated air is pumped from the top, the air blown onto the trays being collected by means of apertures in a central vertical sheath which extends between the two columns of trays and in which the air is drawn upwardly.

22. A tray cabinet according to claim 21, characterized in that the electrical apparatus of said cabinet is placed substantially inside on a removable drawer located in the base of the cabinet, and protected from humidity coming mainly from condensation.

23. A tray cabinet according to claim 22, characterized in that it comprises a device for regulating the heating of the thermally insulated heating chambers in the trays, the regulation being carried out by time constants, by supplying the electric elements of the trays with electricity intermittently according to intervals of time predetermined in accordance with a heating program.

24. A tray cabinet according to claim 4, characterized in that the element is constituted by a flat stainless wire wound around at least one strip of insulating material, two plates of the same material being placed on either side of the juxtaposed strips to form an insulating protection.

25. A tray cabinet according to claim 24, characterized in that the plates and the strips of insulating material resistant to heat are assembled by clipping with stainless metal clips.

26. A tray cabinet according to claim 25, characterized in that the periphery of the metal plate is held against the base of the metal shell by spot-welding.

27. A tray cabinet according to claim 26, characterized in that the thickness of the space reserved for the protected element between the base of the shell and the metal plate is less by approximately ½ a millimeter than the original thickness comprising the strips and the plates of insulating material so as to clamp the element in place, and characterized in that each end of the element is welded to a small metal connecting plate to which is also welded the end of the corresponding electric feed wire, the two small connecting plates being situated above an indentation of the metal plate attached to the base of the shell, so that the clamping brought about between the said metal plate and the base of the shell operates in line with the flat wire itself and not in line with the connecting plates.

* * * * *